United States Patent [19]

Koizumi et al.

[11] 4,108,155

[45] Aug. 22, 1978

[54] HOT AIR TYPE SOLAR HEAT-COLLECTING APPARATUS

[75] Inventors: Hisao Koizumi, Zushi; Yoshinosuke Kawada, Yokohama; Sadao Fujimura, Tokyo, all of Japan

[73] Assignees: Tokyo Shibaura Electric Co., Ltd.; Toshiba House Living Industry Co., Ltd., both of Tokyo, Japan

[21] Appl. No.: 753,825

[22] Filed: Dec. 23, 1976

[30] Foreign Application Priority Data

Dec. 26, 1975 [JP] Japan .................... 50-158589

[51] Int. Cl.$^2$ ........................ F24J 3/02
[52] U.S. Cl. ............... 126/270; 126/271; 237/1 A
[58] Field of Search ............... 126/270, 271, 400; 237/1 A; 98/32, 64, 62

[56] References Cited

U.S. PATENT DOCUMENTS

| | | | |
|---|---|---|---|
| 3,918,430 | 11/1975 | Stout et al. | 126/271 |
| 3,949,732 | 4/1976 | Reines | 126/270 |
| 3,980,071 | 9/1976 | Barber, Jr. | 126/271 |
| 4,019,494 | 4/1977 | Safdari | 126/270 |
| 4,029,258 | 6/1977 | Groth | 126/270 X |

FOREIGN PATENT DOCUMENTS 143,621 12/1961 U.S.S.R. .................... 126/271

Primary Examiner—William F. O'Dea
Assistant Examiner—Larry Jones
Attorney, Agent, or Firm—Oblon, Fisher, Spivak, McClelland & Maier

[57] ABSTRACT

A hot air type solar heat-collecting apparatus includes a plurality of solar heat-collecting units mounted on a roofing, the inlet and outlet of which face the openings of a pair of parallel-extending plenum ducts to communicate therewith through packings mounted between the solar heat-collecting units and the roofing provided with the plenum ducts.

12 Claims, 5 Drawing Figures

HOT AIR TYPE SOLAR HEAT-COLLECTING APPARATUS

BACKGROUND OF THE INVENTION

Field of the Invention

This invention relates to a hot air type solar heat-collecting apparatus used with a room-heating system based on solar heat.

DESCRIPTION OF THE PRIOR ART

In recent years, the so-called solar house has come to be more widely accepted which is provied with a solar heat-collecting apparatus, thereby heating rooms by solar heat accumulated in said heat-collecting apparatus with air used as a heat-transferring medium.

The solar heat-collecting apparatus comprises a heat-collecting plate formed of a metal sheet such as aluminium or copper which has high heat conductivity and whose surface is painted black, a transparent plate of, for example, glass positioned above said heat-collecting plate, and air passages formed on the underside of said heat-collecting plate.

The prior art heat-collecting apparatus of the above-mentioned type is placed on the surface of the roofing of a dwelling. Piping penetrates the roofing and the heat-collecting apparatus has to be connected to air ducts. Thus, the conventional heat-collecting apparatus has the drawbacks that the roofing has to be bored through with holes, depending on the process of fitting air ducts, fitting of the air ducts consumes a great deal of time and work, and it is necessary to seal gaps between the air ducts and the through holes open to the underside of the roofing, difficulties arise in reliably maintaining the airtightness of junctions of the piping with the inlet and outlet of the solar heat-collecting apparatus.

SUMMARY OF THE INVENTION

It is accordingly the object of this invention to provide a hot air type solar heat-collecting apparatus which can be easily provided with high heat efficiency on the roofing of a dwelling with little possibility of giving rise to the leakage of rain or air.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

There will now be described by reference to FIGS. 1 to 4 a hot air type solar heat-collecting apparatus according to an embodiment of this invention.

Figure 1:
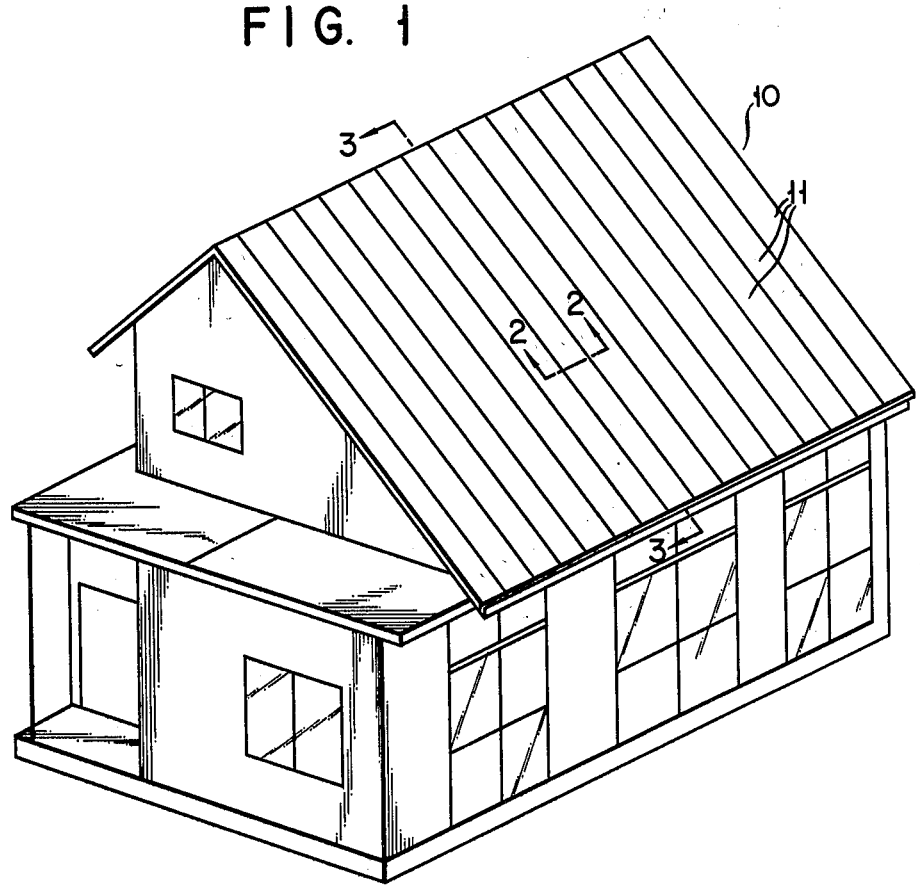
FIG. 1 is an oblique view of a solar house provided with a hot air type solar heat-collecting apparatus according to an embodiment of this invention which is used with a room-heating system based on solar heat.
Figure 2:
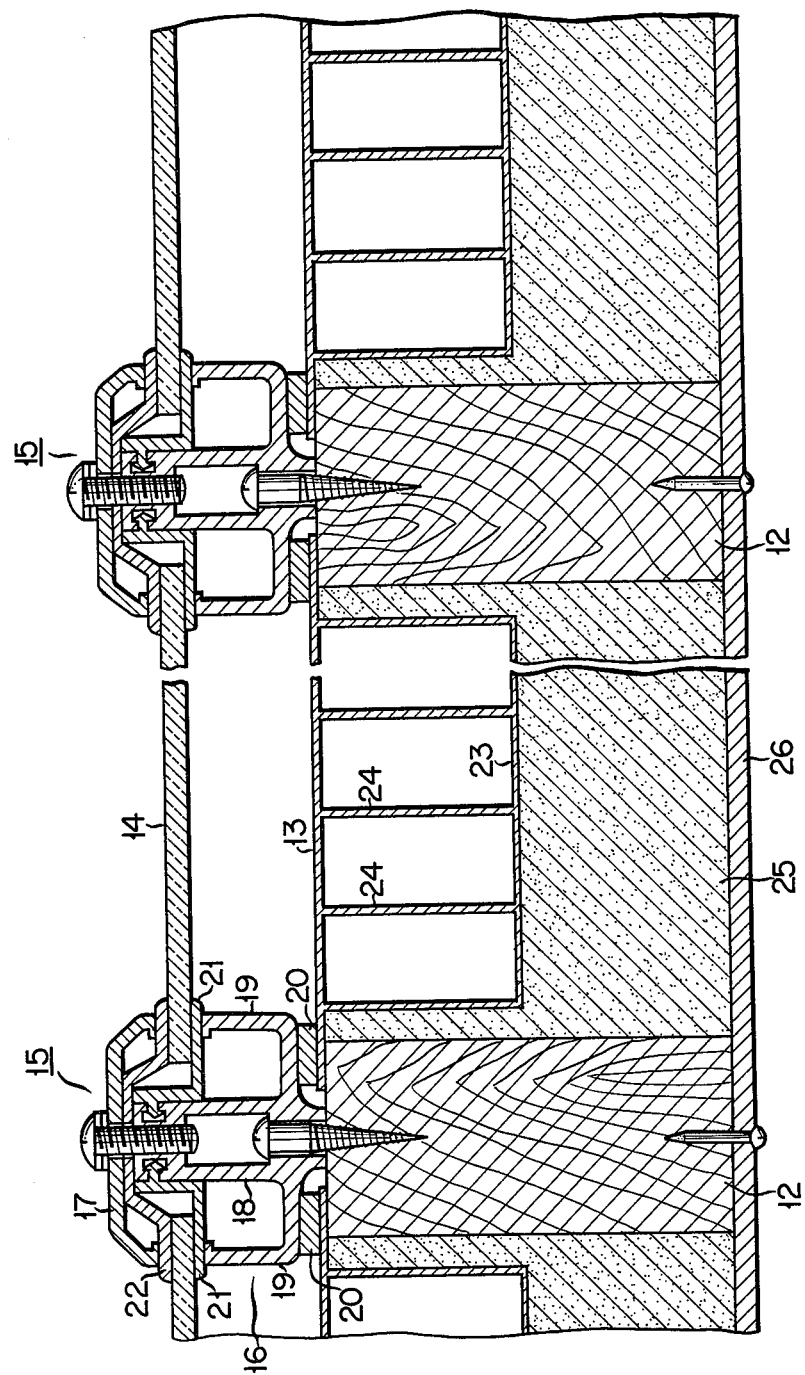
FIG. 2 is a cross-sectional view on line 2—2 of FIG. 1.

FIG. 1 shows the external appearance of the so-called solar house having a solar heat-collecting apparatus 10 installed in the south-directed section of the roofing. The solar heat-collecting apparatus 10 is formed of a large number of solar heat-collecting units 11. The respective solar heat-collecting units 11 extend, as shown in FIG. 2, from the ridge of the roofing of a dwelling to the eaves and are disposed between the adjacent ones of a large number of rafters 12 spaced from each other at a prescribed distance. Provided between the adjacent ones of a plurality of rafters 12 are a heat-collecting plates 13 of, for example, aluminium or copper whose surface is painted black, and a transparent plate 14 of, for example, glass or plastics material which is positioned above the heat-collecting metal plate 13 at a prescribed distance. A plurality of heat-collecting metal plates 13 and transparent plates 14 are supported by support mechanism 15 parallel with the inclined plane of the roofing support mechanism 15 is formed of a lower support member 16 and an upper support member 17, both of which extend along the rafter 12. The lower support member 16 comprises a stem section 18 which has a rectangular cross section and is bolted to the center of the upper surface of the rafter 12 and a base or keep section 19 having a channel-like cross section. This keep section 19 presses the lateral edge of the heat-collecting plate 13 down on the upper surface of the rafter through an elastic packing sheet 20. Both upper lateral sides of the stem section 18 are fitted with the vertical portions of a pair of elastic packing member 21 each having an L-shaped cross section. The horizontal portion of each L-shaped packing member 21 extends between the upper edge of the keep section 19 and the underside of the lateral edge portion of the transparent plate 14. The downward projecting edge portions of both lateral sides of the upper support member 17 press the transparent plate 14 down on the upper surface of the keep section 19 through an elastic packing sheet 22. The upper support member 17 is screwed to the stem portion 18 of the lower support member 16. A trough-like frame member 23 is provided under the solar heat-collecting plate 13 to define an air passage therewith. This air passage is divided into narrow compartments by a large number of partitioning fins 24 extending along the rafters 12. Both lateral sides and underside of the trough-like frame member 23 are covered with heat-insulating material 25 formed of foamed resin. The heat-insulating material 25 is supported on a thin plate 26 fitted to the underside of the rafters 12.

Figure 3:
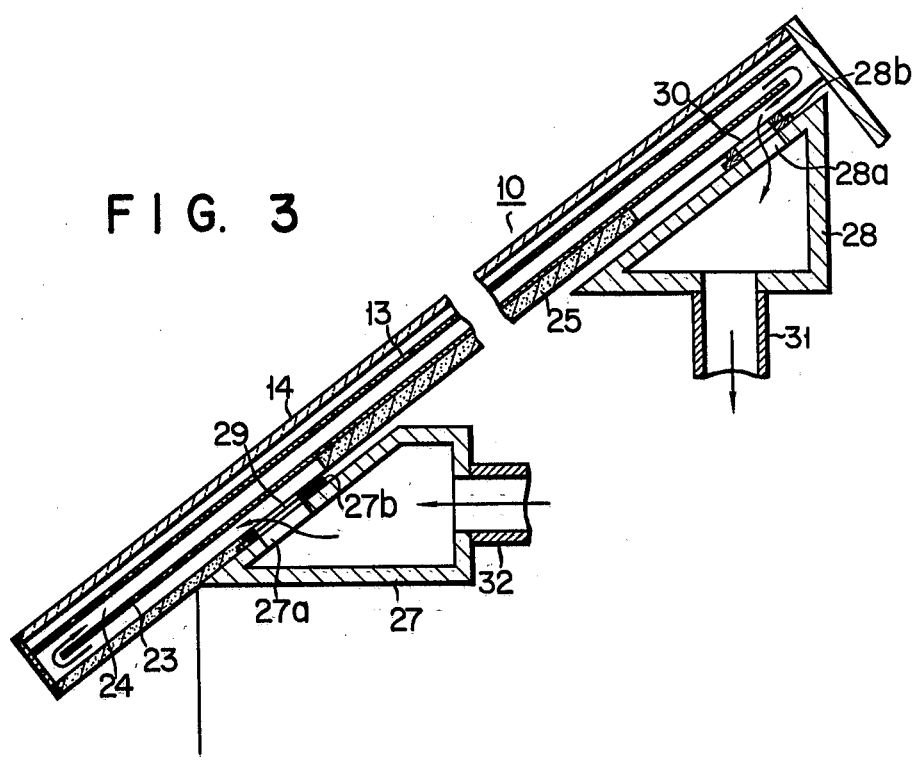
FIG. 3 is a longitudinal sectional view of the solar heat-collecting apparatus.
Figure 4:
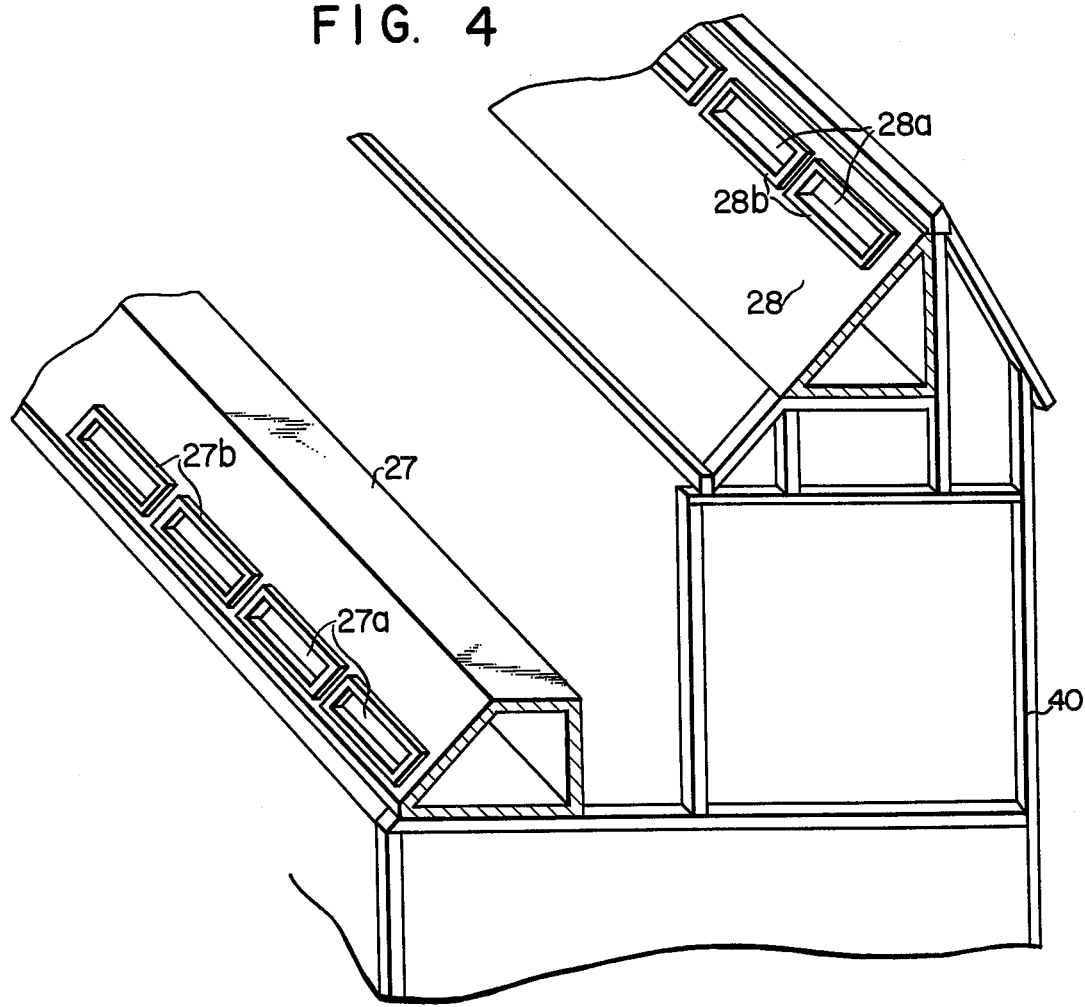
FIG. 4 is an oblique view, partly in section, of a plenum duct included in the solar heat-collecting apparatus.

As seen from FIG. 3, the lower end of the solar heat-collecting apparatus 10 constructed as described above prominently projects obliquely downward over the outer wall of a solar house. The projecting portion constitutes the eaves of the solar house. The heat-collecting plate 13 fully extends in the vertical direction of the solar heat-collecting apparatus 10. However, the vertically extending trough-like frame member 23 and fins 24 are made slightly shorter than the heat-collecting plate 13 in order to define an air passage at both upper and lower ends of the subject solar-heat collecting apparatus 10. Referential numeral 27 of FIG. 3 denotes an inlet plenum duct disposed under the roofing and extending along the eaves of the solar house. Referential numeral 28 shows an outlet plenum duct disposed under the roofing and extending along the ridge of the solar house. Both inlet and outlet plenum ducts 27, 28 have the upper wall inclined in conformity to the gradient of the roofing. The respective upper walls of said plenum ducts 27, 28 are provided with a large number of air ports 27a, 28a lying between the adjacent rafters 12. The outer edges of the air ports 27a, 28a are surrounded with elastic packing strips 27b, 28b made of, for example, rubber or foamed styrol. An air inlet 29 is provided at the lower end of the solar heat-collecting apparatus 10 and an air outlet 30 is provided at the upper end thereof. When the solar heat-collecting apparatus 10 is fitted to the roofing with the air inlet 29 and air outlet 30 engaged with the packing strips 27b, 28b of the air ports 27a, 28a, then the air passages of the solar heat-collecting apparatus 10 communicate with the inlet plenum duct 27 and outlet plenum duct 28 respectively. The plenum ducts 27, 28 extend parallel with each other and are supported on a base 40, as shown in FIG. 4. The outlet plenum duct 28 is connected to the air inlet of a heat-collecting blower (not shown) through a duct 31. The inlet plenum duct 27 is connected to an outlet of the heat-collecting blower through a duct 32 and heat holder (not shown).

Where a heat-collecting blower is driven in a hot air type room-heating system provided with the solar heat-collecting apparatus of this invention constructed as described above, then air passes, as shown in FIG. 3, through the inlet plenum duct 27, air port 27a, and inlet 29 into the heat collecting apparatus from below the trough-like frame member 23. The air is brought into narrow air passages defined by the trough-like frame member 23 with the fins 24 from below said frame member 23, as shown by the arrow. The air flows upward through the narrow air passages up to the upper end of the solar heat-collecting apparatus, and then guided downward to be drawn off into the outlet plenum duct 28 through the outlet 30 and air port 28a. While running through the narrow air passages which are defined by the frame member 23 with the fins 24 and extend along the heat collecting plate 13, air is heated by solar heat. The heated air is conducted to a heat holder through the outlet plenum duct 28 and then to rooms (not shown) being heated.

As mentioned above, the solar heat-collecting apparatus of this invention is mounted on a pair of plenum ducts 27, 28 extending along the ridge and eaves of a dwelling through the packing strips 27b, 28 b, with the rafters 12 used for support. Therefore, the present solar heat-collecting apparatus has the advantages that air does not leak through the junction of the plenum ducts 27, 28 and the solar heat-collecting apparatus, a large number of solar heat-collecting units can be assembled in an integral body, the inlets and outlets of the respective solar heat-collecting units are connected to the associated common plenum ducts, thereby simplifying the construction, should the glass constituting a transparent plate be broken, glass chips would not fall into the rooms or rain would not leak thereinto, because the heat-collecting plate placed under said transparent plate fully extends from the ridge to the eaves of a dwelling, the solar heat-collecting apparatus itself forms part of the inclined plane of the roofing, providing a broader effective heat-collecting area than has been possible in the past, piping need not penetrate the roofing as has been the case with the prior art solar heat-collecting apparatus, preventing the possible leakage of rain through the roofing, an air passage defined by the heat-collecting plate 13 with the trough-like frame member 23 is divided into narrow compartments by a large number of fins 24 extending lengthwise of the solar heat-collecting apparatus, enabling air streams to run in a fixed direction and thereby decreasing resistance to the flow of air and increasing an area of contact with air acting as a heat-transferring medium, and all the above-mentioned factors cooperate in elevating the efficiency of a hot air type room-heating system based on solar heat.

With the foregoing embodiment, the inlet and outlet plenum ducts 27, 28 extend closely along the eaves and ridge respectively of a dwelling. However, this arrangement is not always necessary. The object of this invention will be fully attained, provided both plenum ducts are set in those parts of the underside of the roofing which lie between the ridge and eaves.

Further with the aforesaid embodiment, a solar heat-collecting apparatus is built with the aid of rafters. However, this invention need not be limited to such form of construction.

Figure 5:
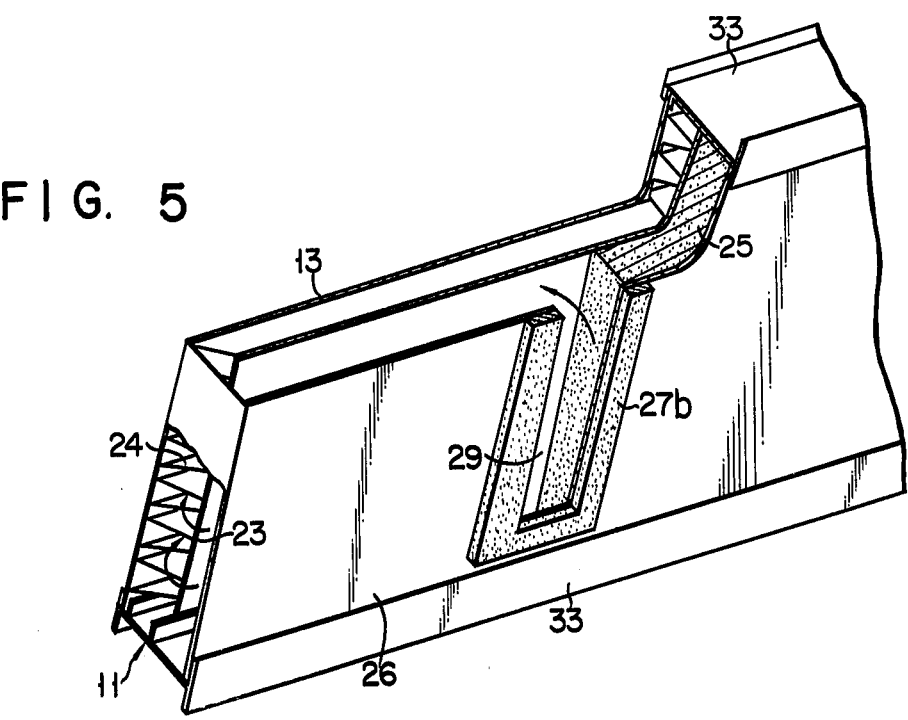
FIG. 5 is an oblique view, partly in section, of a hot air type solar heat-collecting apparatus according to another embodiment of the invention.

Referring to another embodiment of FIG. 5, both lateral edge portions of each solar heating-collecting unit are formed of a pair of parallel-extending frames 33 made of, for example, metal or plastics material. As in the preceding embodiment, a heat-collecting plate 13, trough-like frame 23 and a large number of fins 24 are provided between the above-mentioned parallel frames 33 to define numerous narrow air passages. A thin bottom wall 26 of the heat-collecting unit 11 is provided with an inlet 29 connected to the inlet plenum duct 27 through the packing 27b and an outlet (not shown) connected to the outlet plenum duct 28. The embodiment of FIG. 5 can collect solar heat as effectively as the preceding embodiment.

Obviously numerous modifications and variations of the present invention are possible in light of the above teachings. It is therefore to be understood that within the scope of the appended claims, the invention may be practiced otherwise than as specifically described herein.

What we claim is:

1. A hot air type solar heat-collecting apparatus which comprises a base; a pair of parallel-extending plenum ducts which are supported on the base and lie on the same inclined plane of the roofing of a dwelling and whose upper walls are respectively provided with a plurality of openings formed at predetermined intervals along the lengthwise direction of said plenum ducts; at least one solar heating-collecting unit which extends over the upper walls of both plenum ducts and is provided with an inlet and outlet facing the respective openings of the plenum ducts; and packing means provided between the upper walls of both plenum ducts on one hand and the inlet and outlet of the respective solar heat-collecting unit on the other wherein said packing means has first elastic packing members each so disposed on the upper wall of each of the plenum ducts as to surround the openings of each duct and second elastic packing members each so disposed on the lower surface of each solar heat-collecting unit so as to surround the inlet and outlet of the respective solar heat-collecting units, the first packing and second packing members being engaged to thereby provide a frictional engagement between the plenum ducts and the respective solar heat-collecting unit and an air-tight communication between the openings of the plenum ducts and the inlet and outlet of the respective solar heat-collecting unit.

2. A hot air type solar heat-collecting apparatus provided for the roofing of a solar house, which comprises a pair of plenum ducts which are fitted to said roofing, extend along the ridge and eaves respectively of the solar house and whose upper inclined walls are respectively provided with a plurality of openings arranged at predetermined intervals lengthwise of the plenum ducts; and a number of solar heat-collecting units which are arranged parallel across the roofing, fully extending from the ridge to the eaves of the solar house along the inclined plane of the roofing, and are each provided with an inlet and outlet communicating with the openings of both plenum ducts, and are engaged through packing means against the upper inclined walls of both plenum ducts wherein said packing means has first elastic packing members each so disposed on the upper wall of each pair of plenum ducts as to surround the openings of each pair of plenum ducts and second elastic packing members each so disposed on the lower surface of each of said solar heat-collecting units as to surround the inlet and outlet of the respective solar heat-collecting units, the first packing and second packing members being engaged to thereby provide a frictional engagement between the pair of plenum ducts and the respective solar heat-collecting units and an air-tight communication between the openings of the pair of plenum ducts and the inlet and outlet of the respective solar heat-collecting units.

3. The solar heat-collecting apparatus according to claim 2, wherein the solar heat-collecting units each comprises a transparent plate; a heat-collecting plate spatially placed below the transparent plate; a frame member provided under the heat-collecting plate to define an air passage therewith; and a plurality of partitioning fins disposed in the air passage.

4. The solar heat-collecting apparatus according to claim 3, wherein the solar heat-collecting units are disposed between adjacent rafters of a plurality of rafters spatially arranged across the roofing of said solar house.

5. The solar heat-collecting apparatus according to claim 3, wherein the solar heat-collecting units are fitted to the roofing of said solar house with both lateral sides supported by a pair of frames.

6. The solar heat-collecting apparatus according to claim 3, wherein the solar heat-collecting units comprise an auxiliary air passage which is connected to both ends of the air passage, and defined by the underside of the frame member and which communicates with the inlet and outlet of the solar heat-collecting units.

7. A hot air type solar heat-collecting apparatus which comprises:
a base;
a pair of parallel-extending plenum ducts which are supported on the base and lie on the same inclined plane of the roofing of a dwelling and whose upper walls are respectively provided with a plurality of openings formed at predetermined intervals along the lengthwise direction of said plenum ducts;
at least one solar heat-collecting unit which extends over the upper walls of both plenum ducts and is provided with an inlet and outlet facing the respective openings of the plenum ducts; packing means provided between the upper walls of both plenum ducts on one hand and the inlet and outlet of the respective solar heat-collecting unit on the other wherein the solar heat-collecting unit comprises a transparent plate; a heat-collecting plate spatially placed below the transparent plate; a frame member provided under the heat-collecting plate to define an air passage therewith; and a plurality of partitioning fins disposed in the air passage forming a plurality of trough-like frame members so as to provide a plurality of narrow compartment air passages disposed between adjacent rafters of a plurality of rafters spatially arranged across the roofing of said solar house and wherein the solar heat-collecting unit fully extends from the ridge to the eaves of the solar house and is disposed between adjacent rafters of said plurality of rafters.

8. The solar heat-collecting apparatus according to claim 7, wherein the solar heat-collecting unit comprises an auxiliary air passage which is connected to both ends of the air passage, and defined by the underside of the frame member and which communicates with the inlet and outlet of the solar heat-collecting units.

9. The solar heat-collecting apparatus according to claim 7, which further comprises support members disposed between said transparent plate and said heat-collecting plate and means for securing said support members to said plurality of rafters.

10. A hot air type solar heat-collecting apparatus provided for the roofing of a solar house, which comprises:
a pair of plenum ducts which are fitted to said roofing extending along the ridge and eaves respectively of the solar house and whose upper inclined walls are respectively provided with a plurality of openings arranged at predetermined intervals lengthwise of the plenum ducts and,
a number of solar heat-collecting units which are arranged parallel across the roofing, fully extending from the ridge to the eaves of the solar house along the inclined plane of the roofing, and are each provided with an inlet and outlet communicating with the openings of both plenum ducts, and are engaged through packing means positioned against the upper inclined walls of both plenum ducts and around the inlet and outlet of each solar heat-collecting unit wherein the solar heat-collecting units each comprise a transparent plate, a heat-collecting plate spatially placed below the transparent plate, a frame member provided under the heat-collecting plate to define an air passage therewith, and a plurality of partitioning fins disposed in the air passage forming a plurality of trough-like frame members so as to provide a plurality of narrow compartment air passages disposed between adjacent rafters of a plurality of rafters spatially arranged across the roofing of said solar house.

11. The solar heat-collecting apparatus according to claim 10, wherein the solar heat-collecting units comprise an auxiliary air passage which is connected to both ends of the air passage, and defined by the underside of the frame member and which communicates with the inlet and outlet of the solar heat-collecting units.

12. The solar heat-collecting apparatus according to claim 10, which further comprises support members disposed between said transparent plate and said heat-collecting plate and means for securing said support member to said plurality of rafters.

* * * * *